United States Patent [19]

Suzuki

[11] Patent Number: 5,701,000
[45] Date of Patent: Dec. 23, 1997

[54] CODE READER AND CODE READING METHOD FOR READING CODE PRINTED ON SURFACE OF PRINTING MEDIUM

[75] Inventor: Masashi Suzuki, Mishima, Japan

[73] Assignee: Kabushiki Kaisha TEC, Shizuoka, Japan

[21] Appl. No.: 500,185

[22] Filed: Jul. 10, 1995

[30] Foreign Application Priority Data

Jul. 15, 1994 [JP] Japan .................................. 6-164009

[51] Int. Cl.$^6$ ...................................... G06K 7/10
[52] U.S. Cl. ................ 235/462; 235/455; 235/470; 235/472
[58] Field of Search ................ 235/462, 472, 235/455, 463, 470, 454

[56] References Cited

U.S. PATENT DOCUMENTS

| | | | |
|---|---|---|---|
| 4,528,444 | 7/1985 | Hama et al. | 235/463 X |
| 5,248,871 | 9/1993 | Takenaka | 235/463 X |
| 5,294,783 | 3/1994 | Hammond, Jr. et al. | 235/463 X |
| 5,298,728 | 3/1994 | Elliott et al. | 235/463 |
| 5,349,171 | 9/1994 | Tamai et al. | 235/463 X |
| 5,350,908 | 9/1994 | Bechtel | 235/462 |
| 5,396,053 | 3/1995 | Swartz et al. | 235/462 |
| 5,418,357 | 5/1995 | Inoue et al. | 235/462 X |

*Primary Examiner*—Donald T. Hajec
*Assistant Examiner*—Michael G. Lee
*Attorney, Agent, or Firm*—Frishauf, Holtz, Goodman, Langer & Chick

[57] ABSTRACT

A code reader, for reading a code printed on a surface of a printing medium, includes a photoelectric device for converting light reflected from the code into an electric signal. An amplifier is provided for amplifying the electric signal converted by the photoelectric device. A gain adjusting device is provided for adjusting a gain of the amplifier such that a summit level of the electric signal can be raised to a predetermined upper limit level. A digitizing device is provided for converting the electric signal amplified by the amplifier into a binary signal, using a predetermined level.

25 Claims, 2 Drawing Sheets

CODE READER AND CODE READING METHOD FOR READING CODE PRINTED ON SURFACE OF PRINTING MEDIUM

BACKGROUND OF THE INVENTION

1. Field of the Invention

This invention relates to a code reader and a code reading method for converting, light reflected from a code printed on a surface of a printing medium into an electric signal, and further converting the electric signal to a binary signal, in order to read the code.

2. Description of the Related Art

A code reader for reading a code printed on a surface of a printing medium has an image sensor which comprises, for example, a plurality of charge-coupled device elements. In such a code reader, light is emitted onto a code printed on a surface of a printing medium, reflected therefrom and received by each charge-coupled device element. The charge-coupled device element outputs an electric signal corresponding to the amount of the received light.

The electric signal (photograph signal) output from the image sensor comprising the charge-coupled device elements is converted to a binary signal corresponding to white or black by means of a comparator, etc. For example, if the electric signal has a level higher than a predetermined threshold level, it is determined that the signal indicates white. If, on the other hand, the signal has a level lower than the threshold level, it is determined that the signal indicates black.

The level of the electric signal from the image sensor varies depending not only upon whether or not the signal indicates a printed portion (i.e. a portion with ink) of a code printed on the surface of the printing medium, but also upon the intensity distribution of light radiated on a printed surface of the medium. That is, the lower (higher) the intensity of light, the lower (higher) the overall level of an electric signal.

If the overall level of the electric signal from the image sensor varies, the electric signal is hard to convert to an accurate binary signal corresponding to white and black. For example, where the threshold level (reference voltage) is fixed in a digitizing circuit, it is relatively high when the overall level of the electric signal is low. As a result, portions which are determined to be lower than the threshold level (i.e. the portions determined to be black) may well include portions which are actually white.

To avoid this, the conventional code reader employs a complicated circuit for adjusting the threshold level of the digitizing circuit in accordance with a variation in a lower frequency component of an electric signal supplied from the image sensor.

However, it is significantly disadvantageous that the adjusting circuit is complicated in structure. Thus there is a demand for a digitizing circuit having a simple structure and a function for converting an electric signal from the image sensor to an accurate binary signal in accordance with the intensity distribution of light.

SUMMARY OF THE INVENTION

It is a first object of the invention to provide a code reader of a simple structure capable of accurately digitizing an electric signal from an image sensor in accordance with the intensity distribution of light radiated on a code printed on a surface of a printing medium.

It is a second object of the invention to provide a code reader capable of converting an electric signal from an image sensor to an accurate binary signal at high speed in a reliable manner in accordance with the intensity distribution of light radiated on a code printed on a surface of a printing medium.

It is a third object of the invention to provide a code reading method for converting an electric signal from an image sensor to an accurate binary signal in a simple manner in accordance with the intensity distribution of light radiated on a code printed on a surface of a printing medium.

To attain the first object, there is provided a code reader for reading a code printed on a surface of a printing medium, comprising: photoelectric means for converting light reflected from the code, to an electric signal; an amplifier for amplifying the electric signal converted by the photoelectric means; adjusting means for adjusting the gain of the amplifier such that the summit level of the electric signal can be raised to a predetermined upper limit level; and digitizing means for converting the electric signal amplified by the amplifier to a binary signal, using a predetermined level.

The code reader further comprises radiation means for radiating light onto the code printed on the surface of the printing medium.

The code reader further comprises reproduction means for reproducing a code image from the binary signal.

In the code reader, the amplifier has its gain adjusted by a control signal supplied from the gain adjusting means.

In the code reader, the gain adjusting means comprises an integration circuit.

The code reader is disposed to read a two-dimensional symbol.

In the code reader, the radiation means, the photoelectric means, the amplifier, the gain adjusting means and the digitizing means are contained in a case formed integral as one body.

In the code reader, the case is formed to be portable.

In the code reader, the digitizing means comprises a comparator for comparing the electric signal amplified by the amplifier with a reference signal having a predetermined voltage.

Further, there is provided a code reader for reading a code printed on a surface of a printing medium, comprising: photoelectric means for converting light reflected from the code, to an electric signal; amplifier means for raising the highest level of the electric signal to a predetermined upper limit level; and digitizing means for converting the electric signal amplified by the amplifier to a binary signal, using a predetermined level.

To attain the second object, there is provided a code reader for reading a code printed on a surface of a printing medium, comprising: photoelectric means for converting light reflected from the code, to an electric signal; an amplifier for amplifying the electric signal converted by the photoelectric means; gain adjusting means for adjusting the gain of the amplifier such that the summit level of the electric signal can be raised to a predetermined upper limit level; and digitizing means for digitizing the electric signal amplified by the amplifier, using a predetermined level; wherein the gain of the amplifier is adjusted by receiving a control signal from the gain adjusting means which consists of an integration circuit, and the gain of the integration circuit is set to a minimum value corresponding to the speed of image scan.

To attain the third object, there is provided a method for reading a code printed on a surface of a printing medium, comprising the steps of: converting light reflected from the code, to an electric signal; raising the summit level of the electric signal to a predetermined upper limit level; and converting the electric signal amplified by the amplifier, to a binary signal, using a predetermined level.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

DETAILED DESCRIPTION OF THE PREFERRED EMBODIMENT

An embodiment to which a two-dimensional code reader according to the invention is applied will be explained with reference to the accompanying drawings.

Figure 1:
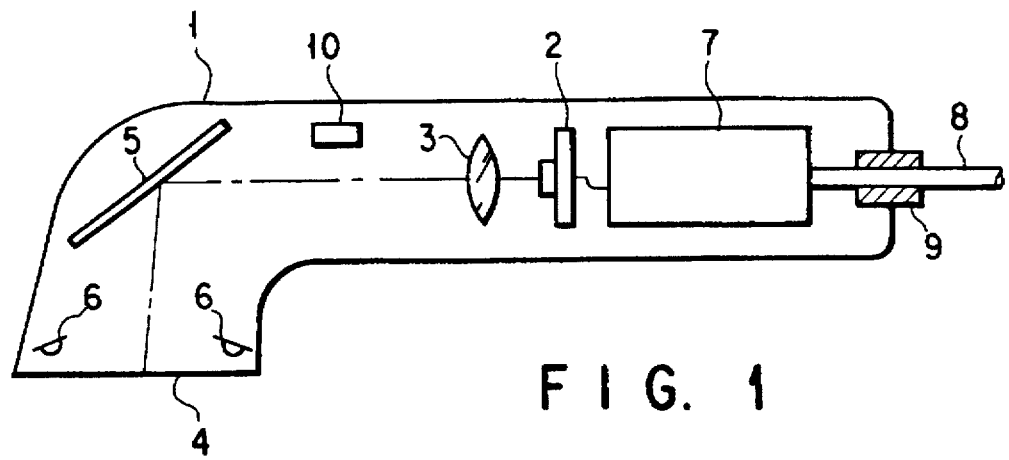
FIG. 1 is a view, showing an essential part of a two-dimensional code reader according to the embodiment of the invention.

FIG. 1 is a view, showing an essential part of the two-dimentional code reader.

Reference numeral 1 denotes a case containing various components which will be explained below. The case 1 is of a handy type formed integral as one body. Reference numeral 2 denotes an area sensor comprising a plurality of charge-coupled device elements arranged in the form of a matrix.

An optical section 3 comprising a lens, etc. is located in front of the area sensor 2. A light beam reflected from a symbol printed on a surface of a printing medium enters the code reader through a reading window 4, reflects on a reflection mirror 5, passes the optical section 3, and reaches that portion of a light-receiving surface of each charge-coupled device element of the area sensor 2, at which an image is formed.

A two-dimensional code, a bar code, characters, etc. may be used as the symbol.

Illumination sections 6 comprising a plurality of emission diodes and diffusion lenses are located in the vicinity of the reading window 4 in the case 1. The reading window 4 is positioned above a symbol printed on a surface of a printing medium, at the time of reading the symbol.

Light is radiated from the illumination sections 6 onto the symbol printed on the printing medium which is opposed to the reading window 4. Then, as described above, the light is reflected from the symbol, further reflected from the reflection mirror 5 and guided to the optical section 3.

The area sensor 2 is connected to a circuit section 7. The circuit section 7 processes a photograph signal output from the area sensor 2. Specifically, the section 7 converts the photograph signal to image data, and transmits the image data to an external image processing unit (not shown) via a cable 8. Alternatively, the section 7 decodes the image data into code data and transmits the code data to a data processing unit such as a host computer. The cable 8 is fixed to the case 1 with a protection member 9 interposed therebetween.

A trigger switch 10 for controlling image-reading timing is provided in the case and connected to the circuit section 7.

Figure 2:
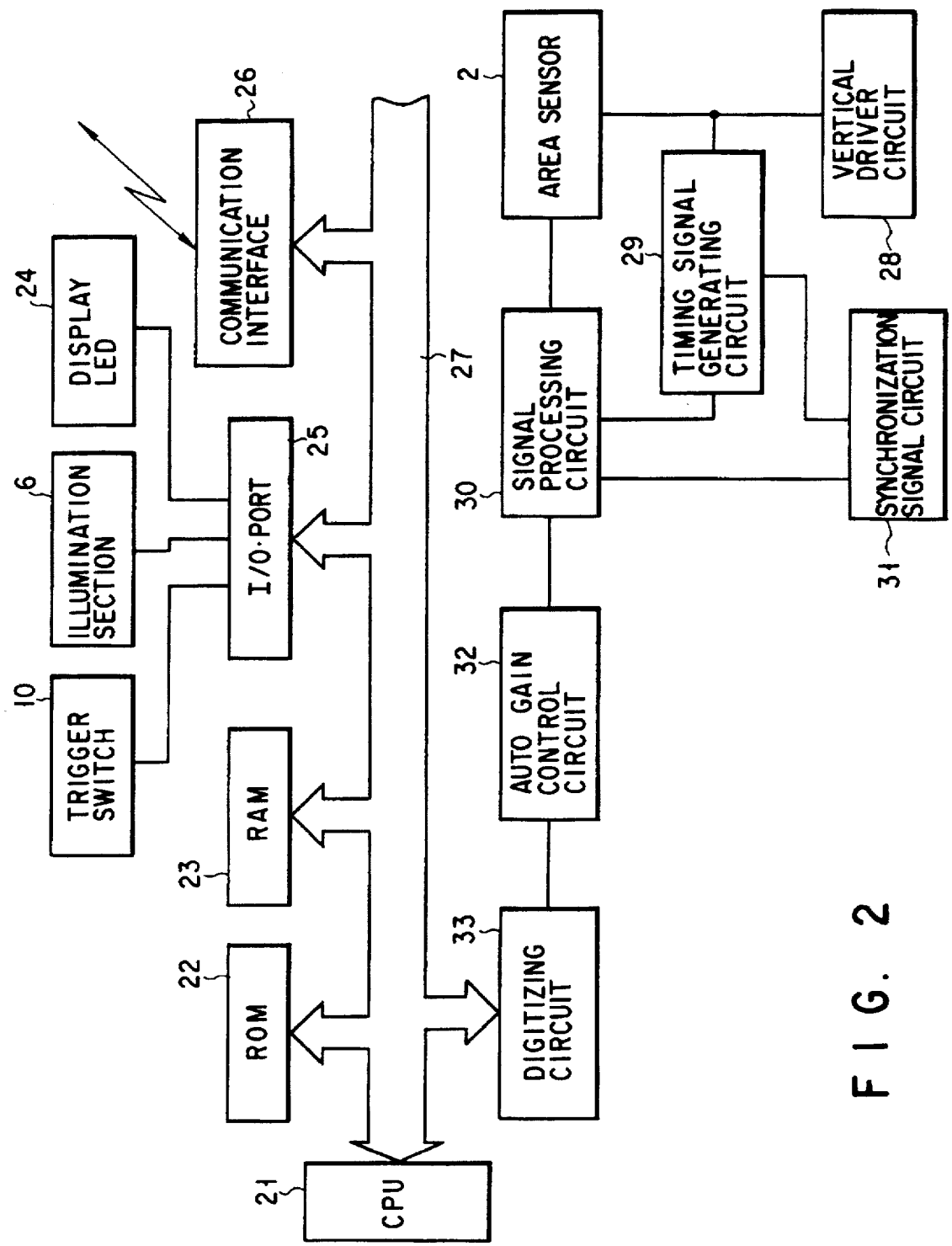
FIG. 2 is a block diagram, showing an essential circuit employed in the two-dimensional code reader of FIG. 1.

FIG. 2 is a block diagram, showing an essential part of the circuit section 7 of the two-dimensional code reader.

Reference numeral 21 denotes a CPU (Central Processing Unit) constituting a control main section. Reference numeral 22 denotes a ROM (Read Only Memory) storing program data used by the CPU 21. Reference numeral 23 denotes a RAM (Random Access Memory) having various memory areas used by the CPU 21. Reference numeral 24 denotes a display LED (Light Emitting Diode), which is not shown in FIG. 1. Reference numeral 25 denotes an I/O (Input/Output) port connected to the display LED 24. Reference numeral 26 denotes a communication interface for controlling the transmission of data to the external image processing unit via the cable 8.

The CPU 21 is connected to the ROM 22, the RAM 23, the I/O port 25, and the communication interface 26 via a system bus 27.

The system bus 27 comprises an address bus, a data bus, and a control bus (not shown).

The area sensor 2 receives read timing signals output from a vertical driver circuit 28 and a timing signal generating circuit 29. Electric charges accumulated in the charge-coupled device elements of the area sensor 2 are sequentially output, like a TV scan signal, in synchronism with the read timing signals. The sequentially-output signal serves as a photograph signal, which is input to a signal processing circuit 30.

The signal processing circuit 30 further receives a read timing signal and a synchronizing signal from the timing signal generating circuit 29 and a synchronizing signal circuit 31, respectively. On the basis of the read timing signals and the synchronizing signal, the signal processing circuit 30 increases the amplitude of the photograph signal, and cuts the noise of the same, etc. Further, the circuit 30 outputs the processed photograph signal to an auto gain control circuit 32 on the basis of the read timing signal and the synchronizing signal.

As will be explained later, the auto gain control circuit 32 automatically adjusts the gain of an amplifier to adjust the amplitude of the photograph signal to an appropriate level. By virtue of the auto gain control circuit 32, the photograph signal output from the signal processing circuit 30 is automatically amplified such that its highest level is raised to a predetermined upper limit level.

The photograph signal amplified to an appropriate level is converted to a binary signal by a digitizing circuit 33, using a preset predetermined level. As a result, binary data which can be processed by the CPU 21 is prepared.

The CPU 21 processes the binary data to create image data. The image data is stored in the RAM 23. The CPU 21 also analyzes the image data. In the analysis, an image pattern which is considered the feature of a code is searched from the image data, thereby extracting an image data portion corresponding to the code. If necessary, the extracted image data portion is decoded into code data. The image data portion or the code data is transmitted from the communication interface 26 to the external image processing unit or the data processing unit via the cable 8.

Figure 3:
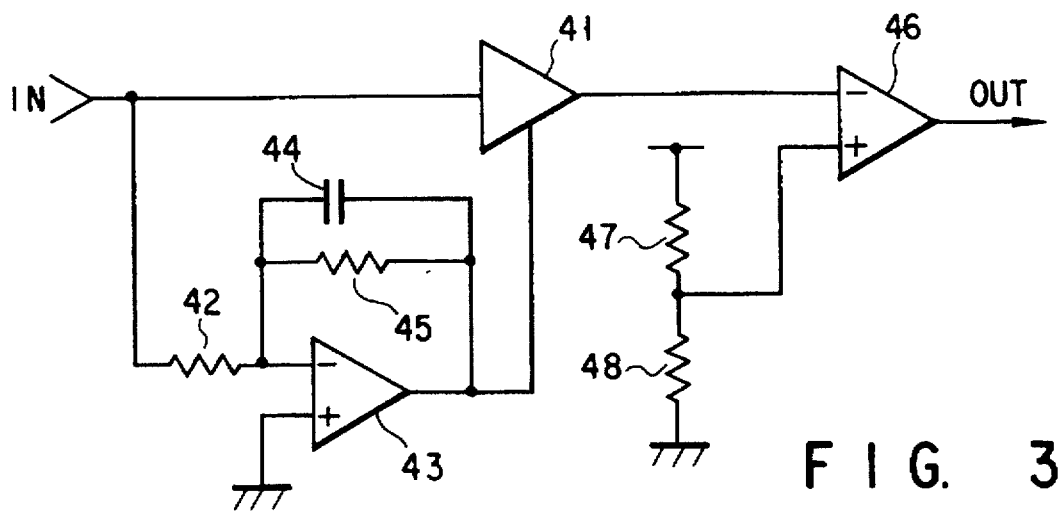
FIG. 3 is a circuit diagram, showing examples of an auto gain control circuit and a digitizing circuit incorporated in the FIG. 1 embodiment.

FIG. 3 shows examples of the auto gain control circuit 32 and the digitizing circuit 33.

In FIG. 3, a photograph signal output from the signal processing circuit 30 is input from a terminal IN. The input photograph signal is applied to the input terminal of an amplifier 41 with a gain control terminal, and also to the inverted input terminal of an operational amplifier 43 via a first resistor 42.

A capacitor 44 and a second resistor 45 are connected in parallel between the inverted input terminal and the output terminal of the operational amplifier 43. The non-inverted input terminal of the operational amplifier 43 is connected to the ground (0V).

Thus, the operational amplifier 43, the capacitor 44 and the second resistor 45 constitute an integration circuit as gain adjusting means. The output terminal of the integration circuit, i.e. the output terminal of the operational amplifier 43, is connected to the gain control terminal of the amplifier 41.

To output the photograph signal from the auto gain control circuit 32 to the digitizing circuit 33 in a reliable manner at high speed, it is advantageous that the time constant of the integration circuit is as low as possible. In other words, it is advantageous that the product RC of the capacity C of the capacitor 44 and the resistance R of the resistor 45 is as low as possible. Accordingly, it is desirable, in general, to set the output speed to about 40 ms which corresponds to the scan time of an image signal for one screen.

As explained above, the auto gain control circuit 32 comprises the amplifier 41 with the gain control terminal, the first resistor 42, the operational amplifier 43, the capacitor 44 and the second resistor 45.

The output terminal of the amplifier 41 is connected to the inverted input terminal of a comparator 46. A series voltage divider circuit consisting of a third resistor 47 and a fourth resistor 48 is connected between a power supply and the ground. The non-inverted input terminal of the comparator 46 receives a divided voltage output from the series voltage divider circuit, which serves as a predetermined level.

The output terminal of the comparator 46 is connected to the system bus 27 via a latch circuit, a shift register, etc. (not shown). The digitizing circuit 33 consists of the comparator 46 and the third and fourth resistors 47 and 48.

The handy-type two-dimensional code reader constructed as above is positioned above a printing medium, with the reading window 4 placed above a symbol, such as a two-dimensional code, a multistage bar code, a character, etc., printed on the printing medium.

Light is radiated from the illumination sections 6 onto the symbol, reflected therefrom, and guided to the reflection mirror 5. Then, the light reflects from the mirror 5 and reaches that portion of the area sensor 2 by means of the optical section 3, at which an image is formed.

Upon receiving the light, the area sensor 2 outputs a photograph signal (analog electric signal) corresponding to the amount of the light, in synchronism with timing signals from the vertical driver circuit 28 and the timing signal generating circuit 29.

The photograph signal is fetched by the signal processing circuit 30 in synchronism with the timing signal from the timing signal generating circuit 29 and a synchronizing signal from the synchronizing signal circuit 31. The signal processing circuit 30 extracts only that portion (in which the level varies) of the photograph signal which corresponds to the symbol, on the basis of variations in the photograph signal. The circuit 30 synchronizes the partially extracted signal with vertical and horizontal synchronizing signals output from the synchronizing signal circuit 31, thereby obtaining a TV image signal.

Figure 4:
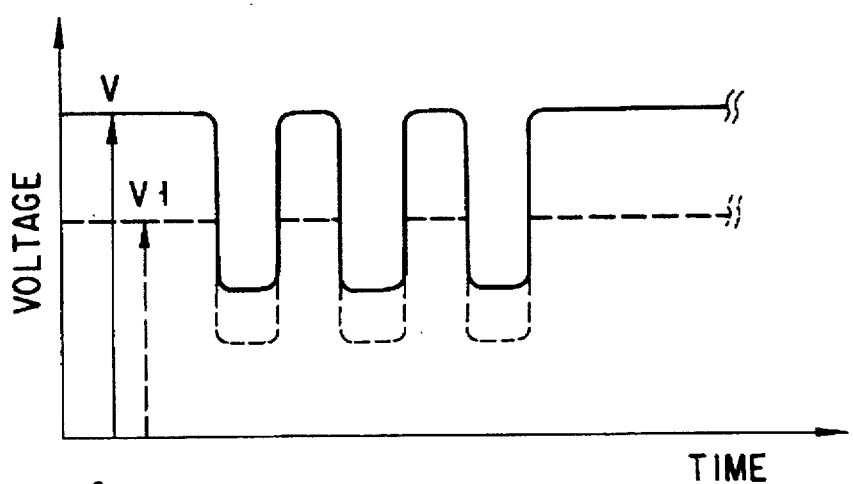
FIG. 4 is a view, showing the waveform of an electric signal output from the auto gain control circuit employed in the FIG. 1 embodiment, and a threshold level.

The auto gain control circuit 32 amplifies the thus-obtained TV image signal to a level appropriate to digitization. For example, as is shown in FIG. 4, the high level V1 (highest level) of the TV image signal is raised to an appropriate high level V (upper limit level).

The TV image signal is input to the gain control terminal of the amplifier 41 after being integrated by the integration circuit consisting of the operational amplifier 43, the capacitor 44 and the second resistor 45. As a result, the high level V1 of the TV image signal is raised to the appropriate high level V.

Where the determination level is fixed in the digitizing circuit 33 to a level obtained by dividing the difference between the high level V and the ground voltage (0V) by a predetermined ratio, a TV image signal supplied from the signal processing circuit 30 can be converted to an accurate binary signal at all times after being amplified by the amplifier 41 (the auto gain control circuit 32).

The binary signal is stored as image data (e.g. dot image data) in the RAM 23, etc. The CPU 21 extracts two-dimensional code portion data from the stored image data, and analyzes the extracted data to obtain code data.

As explained above, the embodiment of the invention employs the amplifier 41 with the gain control terminal, and the integration circuit consisting of the operational amplifier 43, the capacitor 44 and the second resistor 45 for supplying the gain control terminal with a control signal. In this structure, the time constant determined by the capacitor 44 and the second resistor 45 is set to about 40 ms which corresponds to the scan time of a TV image signal for one screen. Further, the TV image signal supplied from the area sensor 2 via the signal processing circuit 30 has its summit level raised to a predetermined upper limit level by means of the amplifier 41. This being so, the invention of a simple structure consisting of the amplifier 41 with the gain control terminal and the integration circuit can convert the TV image signal to an accurate binary signal in a reliable manner, using a predetermined level.

Even where the time constant is longer than the scan time of a TV image signal for one screen, the TV image signal can be converted to accurate binary data by repeating the reading of the signal a few times.

Further, since the gain of the integration circuit is reduced in accordance with the scan speed of the TV image signal for one screen, the amplification processing can be performed at high speed in a reliable manner by the amplifier 41 with the gain control terminal, thereby shortening the signal processing time.

As explained above in detail, the invention can provide a code reader of a simple structure capable of converting an electric signal from an image sensor to an accurate binary signal in accordance with the intensity distribution of light radiated on a code printed on a surface of a printing medium.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A code reader for reading a code printed on a surface of a printing medium, comprising:

photoelectric means for converting light reflected from the code into an electric signal;

an amplifier for amplifying the electric signal converted by the photoelectric means;

gain adjusting means for adjusting a gain of the amplifier such that a summit level of the electric signal can be raised to a predetermined upper limit level; and digitizing means for converting the electric signal amplified by the amplifier into a binary signal, using a predetermined level.

2. The code reader according to claim 1, further comprising radiation means for radiating light onto the code printed on the surface of the printing medium.

3. The code reader according to claim 2, further comprising a case which contains therein the radiation means, the photoelectric means, the amplifier, the gain adjusting means and the digitizing means, said case being integrally formed as one body.

4. The code reader according to claim 3, wherein the case comprises a portable case.

5. The code reader according to claim 1, further comprising a reproduction means for reproducing a code image from the binary signal.

6. The code reader according to claim 1, wherein the amplifier includes means for receiving from the gain adjusting means a control signal for controlling adjustment of the gain of the amplifier.

7. The code reader according to claim 6, wherein the gain adjusting means comprises an integration circuit.

8. The code reader according to claim 7, wherein the integration circuit includes means for having a gain of the integration circuit to be set to a minimum value corresponding to a speed of image scan.

9. The code reader according to claim 7, wherein the integration circuit includes means for directly receiving the electric signal converted by the photoelectric means.

10. The code reader according to claim 6, wherein the amplifier has a gain control terminal.

11. The code reader according to claim 1, wherein the photoelectric means comprises an area sensor having two-dimensionally arranged photoelectric elements.

12. The code reader according to claim 11, wherein said code reader is adapted to read a two-dimensional symbol.

13. The code reader according to claim 11, wherein the amplifier includes means for receiving from the gain adjusting means a control signal for controlling adjustment of the gain of the amplifier.

14. The code reader according to claim 13, wherein the gain adjusting means comprises an integration circuit.

15. The code reader according to claim 14, wherein the integration circuit includes means for having a gain of the integration circuit to be set to a minimum value corresponding to a speed of image scan.

16. The code reader according to claim 14, wherein the integration circuit has a gain set to 40 ms corresponding to a speed of image scan.

17. The code reader according to claim 14, wherein the integration circuit includes means for directly receiving the electric signal converted by the photoelectric means.

18. The code reader according to claim 11, wherein the amplifier has a gain control terminal.

19. The code reader according to claim 1, wherein the photoelectric means comprises a charge coupled device.

20. The code reader according to claim 1, wherein the photoelectric means comprises two-dimensionally arranged charge coupled device elements.

21. The code reader according to claim 20, wherein said code reader is adapted to read a two-dimensional symbol.

22. The code reader according to claim 1, wherein the digitizing means comprises a comparator for comparing the electric signal amplified by the amplifier with a reference signal having a predetermined voltage.

23. A code reader for reading a code printed on a surface of a printing medium, comprising:

read means for converting light reflected from the code into an electric signal;

an amplifier for amplifying the electric signal converted by the read means;

gain adjusting means for adjusting a gain of the amplifier such that a summit level of the electric signal can be raised to a predetermined upper limit level; and digitizing means for converting the electric signal amplified by the amplifier into a binary signal, using a predetermined level.

24. A method for reading a code printed on a surface of a printing medium, comprising the steps of:

converting light reflected from the code into an electric signal;

outputting a gain control signal to an amplifier for adjusting a gain of the amplifier such that a highest level of the electric signal is raised to a predetermined upper limit level;

adjusting the gain of the amplifier using the gain control signal, and amplifying the electric signal by means of the amplifier; and converting the electric signal amplified by the amplifier into a binary signal, using a predetermined level.

25. The method according to claim 24, wherein the gain adjusting step includes the step of integrating the electric signal and outputting the integrated signal as the gain control signal for controlling the gain of the amplifier such that the highest level of the electric signal is raised to the predetermined upper limit level.

* * * * *